W. M. MYERS.
Churn.
No. 218,557. Patented Aug. 12, 1879.
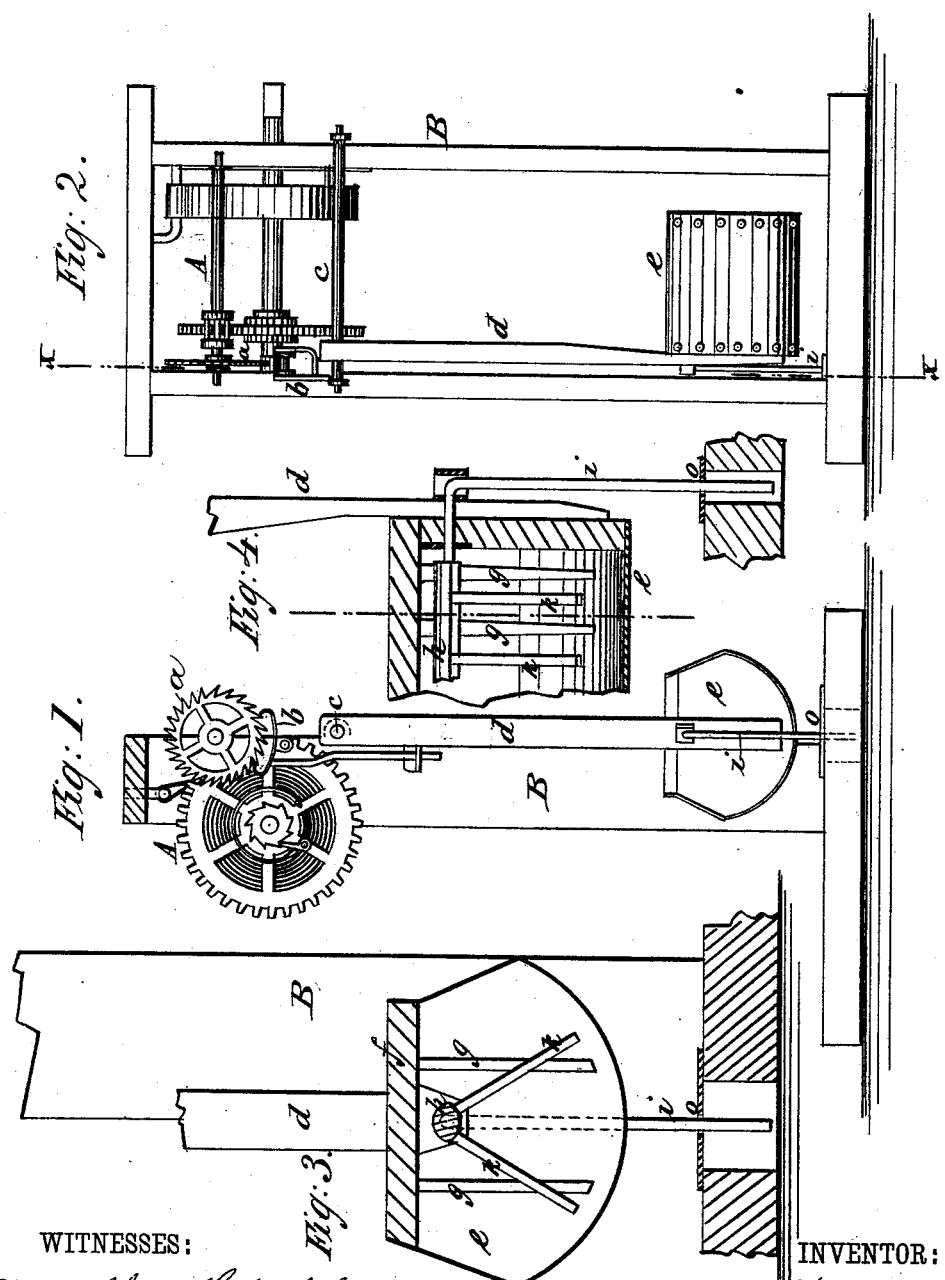

UNITED STATES PATENT OFFICE.

WILLIAM M. MYERS, OF ASHERVILLE, KANSAS.

IMPROVEMENT IN CHURNS.

Specification forming part of Letters Patent No. 218,557, dated August 12, 1879; application filed June 10, 1879.

*To all whom it may concern:*

Be it known that I, WILLIAM M. MYERS, of Asherville, in the county of Mitchell and State of Kansas, have invented a new and Improved Churn, of which the following is a specification.

In my churning apparatus the churn-body is hung as a weight on the end of a pendulum-rod that is vibrated by an escapement and wheel driven by spring or other power, whereby I obtain the required agitation of the milk or cream with the expenditure of a small amount of power.

The churning operation is further facilitated by dashers, which are brought into operation by the vibrations of the pendulum, as more particularly described in connection with the accompanying drawings, wherein—

Figure 1 is a vertical section of the churning apparatus on line $x\ x$ of Fig. 2, which is a side elevation of the same. Fig. 3 is a section of the churn-body and frame in larger size, taken in the same direction as Fig. 1. Fig. 4 is a section of the churn-body taken at right angles to Fig. 3.

Similar letters of reference indicate corresponding parts.

At A is shown a spring-power of any usual character, with a train of gearing, escapement-wheel $a$, and escapement $b$, which power is fixed at the upper part of a suitable frame, B.

I prefer a spring-power; but weights may be substituted for the spring.

Upon a rock-shaft, $c$, is hung a pendulum-rod, $d$, to which the rod of the escapement $b$ is connected, and upon the lower end of rod $d$ the churn-body $e$ is rigidly attached.

The churn-body $e$ is formed with a rounded bottom and flat sides and top, the top $f$ being removable as a cover.

The cover $f$ is fitted with rigid arms or dashers $g$, which project into the churn to near the bottom.

A shaft or head, $h$, is fitted across the upper part of the churn-body on trunnions or axes that enter the sides of the churn $e$, and at one side the trunnion projects in the form of a rod, $i$, that is bent downward and enters loosely an aperture, $o$, in the base of the frame B. The head $h$ carries projecting arm or dashers $k$, arranged intermediately of the dashers $g$.

The spring being wound, and the pendulum-rod and churn-body set in motion, the vibration is maintained by the spring-power and escapement, and the cream in the churn will be thrown from side to side.

The rod $i$ is made of sufficient length to remain in the aperture $o$ during the whole movement in both directions, so that the dashers $k$ are given a movement in a direction opposite to the movement of dashers $g$ with the churn-body, which results in a chopping action of the two sets of dashers on the cream. This action facilitates the churning operation.

The churn-body $e$ may be connected to the rod $d$ by devices that permit its removal when desired, and the apparatus may be constructed of any suitable size, and of wood or metal.

Having thus described my invention, what I claim, and desire to secure by Letters Patent, is—

1. The improved churning apparatus, consisting of the power A, escapement-wheel $a$, escapement $b$, pendulum-rod $d$, and churn-body $e$, combined for operation substantially as described and shown.

2. In combination with the vibrating pendulum-churn $e$, the head $f$, dashers $k$, and rod $i$, substantially as described and shown, and for the purposes specified.

WILLIAM M. MYERS.

Witnesses:
L. C. PARRISH,
W. M. SMURK.